United States Patent [19]
Kohtani

[11] 3,742,826
[45] July 3, 1973

[54] EXPOSURE CONTROL DEVICE
[75] Inventor: Yotaka Kohtani, Tokyo, Japan
[73] Assignee: Canon Kabushiki Kaisha, Tokyo, Japan
[22] Filed: Dec. 31, 1970
[21] Appl. No.: 103,108

[30] Foreign Application Priority Data
Jan. 7, 1970 Japan.................................. 45/2456

[52] U.S. Cl. ............................................. 95/10 CT
[51] Int. Cl. ............................................. G03b 7/08
[58] Field of Search .................... 95/10 CE, 10 CT, 95/53 EA

[56] References Cited
UNITED STATES PATENTS
3,269,287  8/1966  Ost................................................ 95/10
3,609,456  9/1971  Kayaguchi et al. ................ 95/31 X
3,611,159  10/1971 Florsheim et al. .................. 95/10 X
3,092,002  6/1963  Frenk........................................ 95/58
3,526,181  9/1970  Fahlenberg et al..................... 95/53

Primary Examiner—Samuel S. Matthews
Assistant Examiner—Michael L. Gellner
Attorney—Toren & McGeady

[57] ABSTRACT

In the exposure control apparatus disclosed, a photoelectric element converts light to which it is exposed to an electrical quantity. A pulse entry circuit responds to the photo-electric element and enters a sequence of sets of pulses into a memory. Each set of pulses corresponds in number to the electric quantity and erases the previous set. A timing clock responds to a signal from a shutter opening member and keeps reading out the content of the memory until the memory is empty at which time the circuit, in conjunction with the memory, produces a shutter closing signal.

10 Claims, 2 Drawing Figures

EXPOSURE CONTROL DEVICE

BACKGROUND OF THE INVENTION

This invention relates to an exposure control device for cameras and particularly to an exposure control device for cameras having electrical shutters.

In known devices of this type the electrical quantity related to the amount of light is memorized as an analog value for determining the exposure.

SUMMARY OF THE INVENTION

According to an aspect of the invention, a number of pulses corresponding to the light sensed by photoelectric means is entered into a memory. When a shutter is released clock pulses read out the memory until all pulses entered have been read out. A signal then is derived to close the shutter.

According to another aspect of the present invention, the exposure control device has a photo-electric converter means; a pulse train providing means to provide primary pulse train of a number related to the value sensed by the converter means and having a prescribed period; a memorizing and retaining means to memorize and retain the number of said primary pulse train provided by the above mentioned pulse train providing means; an exposure control means to control exposure; pulse train counting means to start counting the number of secondary pulse train having prescribed period at the time when exposure by said exposure control means is initiated; and a comparing means to compare the number of the pulse train memorized and retained by the above mentioned memorizing and retaining means with the number of pulse train counted by said pulse train counting means, and in that the device is formed so that at the time when the number of pulse train memorized by the time when the number of pulse train memorized by the memorizing and retaining means and the numer of pulses counted from the time when exposure is started by the above mentioned pulse train counting means match to each other, the exposed state of said exposure control means is completed by the output of said comparing means.

That is, generally speaking, first an electrical quantity related to the amount of light is obtained using such means as an exposure meter which can convert the amount of light to an electrical quantity, then from the electrical quantity, the pulse train having the number of pulses related to the above mentioned amount of light and having a prescribed repetition rate is obtained using an analogue digital converter. Next, to memorize the pulse train and retain it for a long time is made possible by a so-called register memory which is well known in the field of computers. This provides a memory system which is effective even where a digital memory with a capacitor would be impractical because of insufficient insulation. Such a memory is available in a form that can be built in a single lens reflex camera, etc. pricewise and spacewise because of the technical changeover to IC (Integrated Circuits) in calculators and in logic circuits.

Now, after memorization is completed, such exposure as is related to the amount of light becomes possible by employing such method as adding the number of pulse having a prescribed repeating period generated from the time when exposure is started, then having the exposure completed at the time when the number of pulse comes into accord with the above mentioned number of pulse memorized and retained, or by such method that said number of pulse generated from the time when exposure is started is subtracted from the number of pulse memorized and retained and the exposure is completed at such time as the difference between these two numbers of pulse becomes zero.

It is apparent from the above explanation the special features of the electrical shutter of the present invention over those of a conventional type exist in that so-called long time exposure can be made easily as memorizing and retention for a long time becomes easy. By varying the repetition period of the pulse train used at the time when the amount of light is made to correspond to the number of pulses in a repetition period of the pulse train generated from the time when exposure is started, such photographic information as film sensitivity, diaphragm, etc. can be handled easily with variety and for a wide range. Also the amount of light can be precisely memorized and retained in a short period of time and such long time exposures as correspond to the amount of light becomes possible by making the repetition period of the pulse train used in converting the amount of light to the number of pulse is shorter than that of the pulse train generated from the time when exposure is started, etc. Furthermore, if value of light sensed, memorized value, and photographic information values are to be memorized suitably in a register through a calculator unit and a control unit related with clock pulse as in the above example, the indication of such values as above can be made by simple key operation, shutter button operation or power source switch operation, etc., thus the system can be constructed so that such indication means can appear at the focusing screen surface or corresponding position. It will be especially convenient if the register having an indicating function is used. Naturally a digital indicating means is suitable. For example, electro-luminescent diodes, liquid crystals, etc. can be formed into a mosaic indicating board.

When memorizing is done by capacitors, if compression characteristics of such three-terminal photoconductive elements as log diodes, transistors, etc. having wide dynamic range, are used to compress and memorize the value of light sensed, memorizing and retaining said memorized value, and the memorized value can be again expanded and regenerated as a time value through the charging characteristics to another capacitor by a pulse generator with a prescribed time period which works at the time of exposure, the device can be simplified while an error in exposure deriving from insufficient insulation still remain as a problem but of minor degree.

Now the present invention shall be explained in detail referring to the drawings of examples.

DESCRIPTION OF PREFERRED EMBODIMENTS

Figure 1:
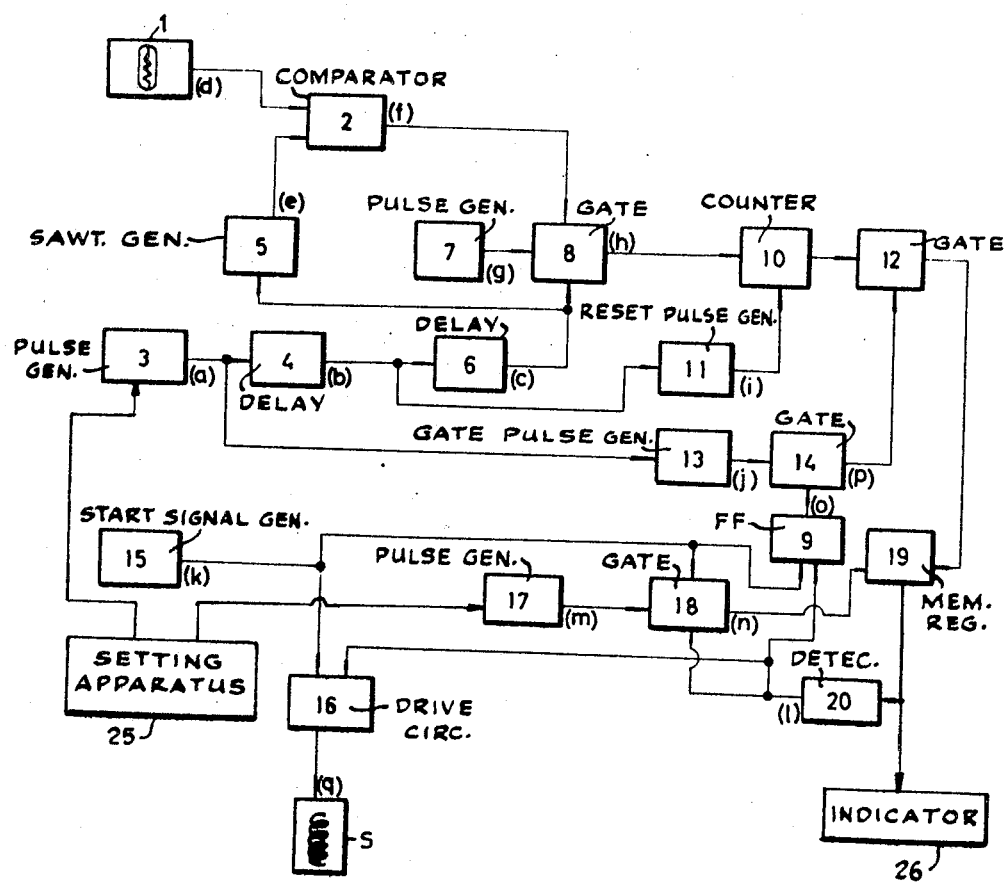
FIG. 1 is a block diagram of an electric shutter according to the present invention.
Figure 2:
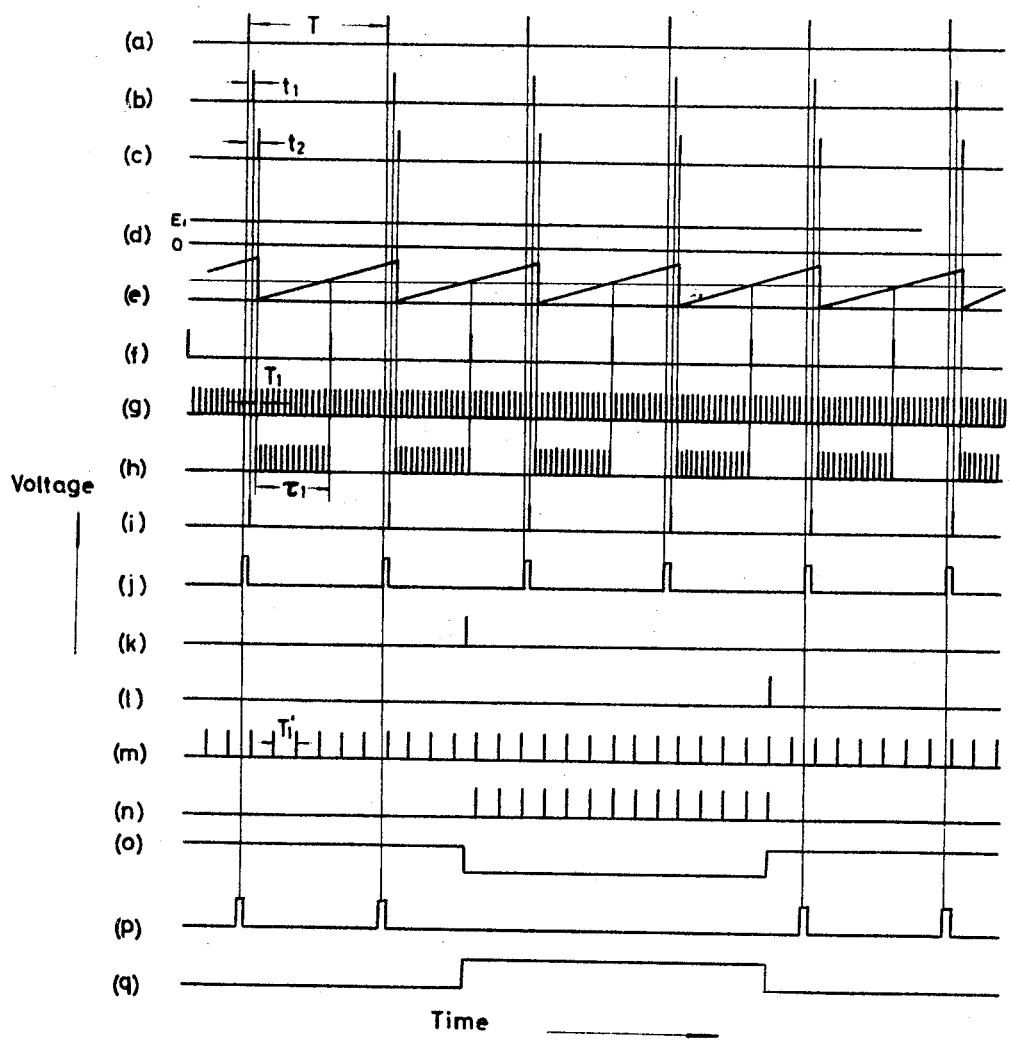
FIG. 2 is a schematic drawing showing voltage wave forms at each section of the block diagram shown in FIG. 1.

In FIG. 1, 1 is a light sensor having an element to convert the amount of light to the electrical quantity and a circuit to generate the voltage $E_1$ shown in FIG. 2 (d) corresponding to the amount of light. The voltage $E_1$ is low when the light is bright while it is high when the light is dim. A pulse generator 3 produces a starting signal ($a$) as shown in FIG. 2 ($a$), in the form of differential pulses having a period T. The pulse generator (oscillator) oscillates with a constant period and may have the form of an astable multi-vibrator.

A delay circuit 4 delays the starting signal ($a$) by a constant time $t_1$ and generates delay pulses ($b$) as shown in FIG. 2 ($b$). A delay circuit 6 delays the output of the delay circuit 4 by a constant time $t_2$ and generates delay pulses ($c$) as shown in FIG. 2 ($c$).

The delay times $t_1$ and $t_2$ are set to be substantially shorter than the period T of the starting signal ($a$). A sawtooth generator 5 generates a comparison signal in the form of a saw-tooth wave ($e$) as shown in FIG. 2 ($e$) and is synchronized with the delay pulse ($c$) of the delay circuit 6. That is, the comparator output becomes zero when the delay pulse ($c$) is generated at the delay circuit 6, and the voltage of the output increases the time increases. A comparator 2 reponds to the sensor 1 and the generator 5 to generate pulses ($f$) as shown in FIG. 2 ($f$) at the time when the output voltage $E_1$ of the light receiving part 1 equals with the electric potential of the saw tooth wave ($e$)., A clock pulse generator serves to generate clock pulses ($g$) as shown in FIG. 2 ($g$) having a constant period $T_1$ which is substantially shorter than the period T of the starting signal ($a$). A gate circuit 8 passes the clock pulses ($g$) during the period of time starting when the delay pulse ($c$) is generated and ending at the time when the pulse ($f$) is generated. At other times the gate 8 passes no pulses. The wave form of output voltage of the gate circuit 8 is shown in FIG. 2 ($h$). A counter 10 serves to sense the value of light sensed by counting the number of the output pulses ($h$) of the gate (8) as shown in FIG. 2 ($h$). A. reset pulse generator 11 generates a reset pulse ($i$) as shown in FIG. 2 ($i$) for resetting the counter 10. The reset pulse ($i$) passes to the counter 10 when the delay pulse ($b$) is generated and is synchronized with the delay pulse ($b$). Members 12 and 14 are gate circuits, 13 is a gate pulse generator, 9 is a bistable multi-vibrator, 19 is a memory and a register composed of flip-flops, etc.

At the time when a starting signal ($a$) is generated, the gate pulse ($j$) shown in FIG. 2 ($j$) is generated at the gate pulse generator 13. When the output which is connected to the gate circuit 14 of the bistable multi-vibrator 9 has a high electric potential, the gate 14 passes the gate pulse ($j$), and when its output has a low potential the pulse ($j$) is not passed. The gate pulse ($j$) passing through the gate circuit 14 drives the gate circuit 12,. The gate 12 will be released during same period of time as the gate pulse ($j$), and the content memorized and retained in the counter 10 is transferred to the register 19. A starting signal generator serves to generate exposure starting pulses ($k$) as shown in FIG. 2 ($k$) at the time when a shutter button not shown in the drawing, is pressed to start the exposure, and 17 is a clock pulse generator to generate the clock pulse 5 ($m$) as shown in FIG. 2 ($m$) having a period $T'_1$. Member 18 is a gate circuit, 20 is a detector for completion of subtraction so that a subtraction completion pulse ($l$) as shown in FIG. 2 ($l$) is generated at the output of subtraction completion detecting part at the time when the content of the register 19 becomes zero.

The bistable multi-vibrator or flip-flop 9 is a vibrator whose output ($o$) supplied to the gate circuit 14 is reset by the starting pulse ($k$) and becomes low electric potential. At the time when a subtraction completion pulse ($l$) is generated, the pulse (k) is set and becomes high electric potential. The gate circuit 18 releases the gate from the time the starting pulse ($k$) is generated to the time the subtraction completion pulse ($l$) is generated, and applies clock pulses ($n$) as shown in FIG. 2 ($n$) to the register 19.

The clock pulse ($n$) is used as a read out pulse for the content of the resister 19, and materially subtracting the content of the register 19 as the content transferred from the counter 10 to the register 19 is read out.

A drive circuit 16 serves to change the amount of exposure, that is a device to drive the shutter. It releases the shutter at the time when a starting signal ($k$) is generated and closes the shutter at the time when subtraction completion pulse ($l$) is generated.

Next the function of the present invention shall be explained referring to an example.

The light from an object is detected at the light sensor 1, and a voltage $E_1$ corresponding to the amount of light is generated as the output ($d$) of the same. The voltage $E_1$ will be low when the light is bright, and will be high when the latter is dim. The light sensing start pulse generator 3 always generates pulse ($a$). Therefore the saw tooth wave ($e$) is generated at the generator 5. The output voltage $E_1$ of the sensor 1 and the voltage of the saw tooth wave ($e$) are compared at the comparator 2, and pulse ($f$) is generated at the output of the comparator 2 when both voltages are equal. The clock pulse ($g$) is gated at the gate circuit 8 and is supplied to the counter 10 only during such period of time from generation of a delay pulse ($c$) to generation of a pulse ($f$) the output of the comparator 2. That is, pulses ($h$) such as shown in FIG. 2 ($h$) are supplied to the counter 10. As the counter 10 will be in a ready-to-count state from the time when the reset pulse ($i$) is generated, the number $n_1 = (\tau_1/T_1)$ of the clock pulse ($h$) which passes through the gate circuit 8 during the above mentioned period of time $\tau_1$ will be counted by the counter.

Since the output ($o$) being supplied to the gate 14 of the bistable multi-vibrator 9 will be of high potential when the shutter button is not being pressed, the gate pulse ($j$) generated at the time when a starting signal ($a$) is generated passes through the gate 14 and is supplied as it is to the gate 12. At the time when the gate pulse ($j$) is supplied to the gate 12, the content of the counter 10 is transferred to the register 19.

In this case the device is so arranged that the previously memorized content which has been memorized and retained in the resister 19 is forcedly reset, i.e. erased, and the newly transferred content will be newly memorized and retained without relation to the previously memorized content. Therefore, the amount of incident light into the light receiving part will be memorized and retained at the register 19 sequentially or successively as the number of pulse corresponding to the amount of light received at the light receiving part 1 in synchronize with the period T of the starting signal ($a$).

Now, when a shutter button which is not shown in the drawing is pressed, then the starting signal ($k$) is generated, and the starting signal ($k$) is supplied to a the drive circuit 16 to drive the shutter then the shutter S is released by the output ($q$) of the device. At the same time the starting signal is supplied also to the gate circuit 18 to release the gate circuit 18, and is also supplied to bistable multi-vibrator 9, to make the output ($o$) supplied to the gate circuit, 14 exhibit a low electric potential, that is, to close the gate 14. Therefore, the gate circuit 14 is closed and the gate pulse (j) will not be supplied to the gate circuit 12, thus the memorized content which has been memorized before the shutter button is pressed is memorized and retained as it is without being renewed.

On the other hand since the gate circuit 18 is released by the starting signal (k), the clock pulse (m) is supplied to the register 19 as the output (n) of the circuit 18. The clock pulse (n) which has been supplied to the register 19 reads out the information corresponding to the number $n_1$ which has been memorized at the register 19 successively. Thus, at the time when the clock pulse (n) reaches the number $n_1$ the content of the register 19 has all been read out therefore the resister 19 then will have no information memorized and retained therein. At such time, a subtraction completion pulse (l) is generated at the output of the subtraction completion detector 20. The subtraction completion pulse (l) is supplied to a device 16 to drive a shutter, closing the same, thus exposure is completed.

At the same time the subtraction completion pulse (l) repeats such operational cycles with a period (time cycle) of T that same pulse is supplied to the gate circuit 18 closing the circuit and at the same time it is supplied also to bistable multi-vibrator 9 reviving the output of said multi-vibrator, thereby releasing the gate circuit 14, then by the output (p) of said circuit 14 transferring the result of sensing light by the counter 10 to the register 19.

As the gate circuit 18 is closed, the clock pulse (m) will not be supplied to the register 19 as shown in FIG. 2 (n) and the gate pulse (j) will be supplied to the gate circuit 12 as the output (p) of the gate circuit 14 as explained previously. Therefore the result of sensed light will be again transferred from the counter 10 to the register 19 in synchronism with the pulse (p) being equalized to the gate pulse (j), thus always being newly memorized and retained.

As is clear from the above explanation the number of pulses which is related to the light receiving device 1 will be repeated in synchronism with the repetition of the starting signal generating part 3 and memorized tentatively at the counter 10, and the content of the counter 10 is transferred to the register 19 at a certain point of time and is rememorized and retained there. The content of the register 19 will have no relationship with the function of the counter 10 except at such time that the content of the counter 10 is transferred to the register. Therefore if a shutter button is pressed at any desired time the gate 12 will release the combination of the counter 10 and the register 19. Thus, the exposure will be independently completed.

It is apparent that as an exposure is completed, the above mentioned function of renewing the memory and retaining the same will be repeated again by the gate 12. A setting apparatus 25 sets the periods of the generators 3 and 17. An indicator 26 reads and displays the digital content of the memory register 19.

Next explanation shall be made on a modified example of the present invention.

Now an optimum exposure time corresponding to the amount of incident light to a sensor where a voltage $E_1$ is generated as the output (d) of the sensor 1 is expressed as $S_1$. (Of course the value of $S_1$ is dependent upon the sensitivity of a sensitised paper used and/or on the state of diaphragm.) When the period $T_1$ of the clock pulse (m) is made the same as the period $T_1'$ of the clock pulse (g), since the information corresponding to the pulse of number $n_1$ is memorized in the register 19, the period of time during which the shutter S is released will be $S_1$ thus providing optimum exposure, if it is generated as the clock pulses (m) having a period as $T'_1 = S_1/n_1$. In this case since $T_1 = T'_1$, $N_1 = n'_1$, the inclination of the saw tooth wave should better be so determined as to provide such $\tau_1$ that is $S_1$ as satisfying $\tau_1 = n_1$, $T_1 = n'_1$, $T'_1 = S_1$.

If $T_1 = T'_1$ it will be possible to have the clock pulse generator 7 serve the function of the generator 17, but it will take a period of time $S_1$ to have the register 19 memorize such member of pulse as corresponding to the amount of light requiring the exposure time of $S_1$. Therefore, as explained in the first example, when the clock pulse generating part 7 and that part 17 are independent from each other with different periods and at the same time making $T_1 < T'_1$, further, providing sharp inclination for the saw tooth wave, and as such period of time as being shorter than $S_1$, for example $T_1 = ½ T'_1$ is necessary to have the register memorize the number of pulse corresponding to such amount of light as requiring expsoure time of $S_1$, then it will be possible to have the memorizing completed with the time of $S_1/2$ by making the inclination of the saw tooth wave two times of the same when $T_1 = T'_1$.

By arranging the parts as mentioned above, in driving a shutter such photographing information as the sensitivity of sensitized paper and/or diaphragm, etc. can be selected freely by varying the period of the clock pulses 7 and 17. This is done, for example, by the setting apparatus 25. That is, an optimum shutter speed is obtained by making the period of the clock pulse 7 two time faster, that is making the frequency ½ or by making the period of the clock pulse 17 ½ that is making its frequency two times, when the aperture area of the diaphragm becomes two times larger or the sensitivity of sensitised paper is two times larger.

On the other hand when the aperture area of the diaphragm becomes half or the sensitivity of sensitised paper is half, the period of the clock pulse 7 is made ½ that is the frequency of the same is made two times larger or the period of the clock pulse 17 is made two times faster that is the frequency of the same is reduced to ½ for obtaining an optimum shutter speed.

The clock pulse generating parts 7 and 17 can be made in such manner that pulse train having the period of any suitable powers of 2 can be easily and precisely obtained from any stage of such well known counter as being obtainable by overlapping the output of the oscillator with any desired frequency and any desired number of stages of bistable multi-vibrator.

While the above explanation has been made mainly on the case when the number $n'_1$ of the output pulse train (n) of the gate circuit 18 is same with the number $n_1$ of the output pulse train (h) of the gate circuit 8, but the present invention will not be limited to such case.

As has been explained above, the electrical quantity related to the amount of light is memorized after being converted to digital amount to determine the exposure in the present invention, the invention will have such affects that memorizing and retention for a long period of time will be easy, long time exposure will be easy, and such information as sensitivity of sensitized paper, diaphragm, etc. can be easily and precisely handled with much variety by freely combining the periods of the clock pulses (g) and (m).

At the same time, by making the period of the clock pulse (g) shorter than the period of the clock pulse (m) and by making the inclination of the saw tooth wave of the output of the comparing signal generating part 5 sharp, it becomes possible to memorize and retain the amount of light within shorter period of time compared to optimum exposure time and to provide the optimum exposure time at the time of exposure. Thus, the present invention can provide such camera system as not only being sufficiently competitive against conventional products in spacewise and pricewise owing to rapid progress in IC technology, etc., but having excellent qualities in a view point of conslidated properties and performance.

What is claimed is:

1. An exposure control apparatus, comprising photoelectric means for converting an amount of light to an electric quantity, memory means, pulse entry means responsive to said photo-electric means for entering into said memory means a sequence of sets of equally spaced pulses each set corresponding in number to an electric quantity being connected, shutter control means for producing shutter operating signals, timing means responsive to a signal from said control means and coupled to said memory means for reading out the value in said memory means and controlling said control means for a time period dependent upon the content of said memory means, said timing means forming clock pulses in response to said control means for reading out said memory means.

2. An exposure control apparatus, comprising photoelectric means for converting amounts of light to electric quantities, memory means, pulse entry means responsive to said photo-electric means for entering into said memory means a sequence of sets of equally spaced pulses each set corresponding in number to sequential ones of the electric quantities, shutter control means for producing shutter operating signals, timing means responsive to a signal from said control means and coupled to said memory means for reading out the value in said memory means and controlling said control means for a time period dependent upon the content of said memory means, said memory means storing a count equal to the pulses entered, said timing means including pulse carrying means for carrying a plurality of equally spaced pulses, gate means for applying said pulses to said memory means in response to a shutter opening signal from said control means so that each pulse reads out one count in said memory means, and detecting means coupled to said memory means for producing a shutter closing signal when the pulses have read the full count in said memory means.

3. An apparatus as in claim 2, wherein pulse generating means supply pulses of equal repetition rate to said pulse entering means and said pulse carrying means.

4. An apparatus as in claim 2, wherein pulse generating means supply pulses having a greater repetition rate to said pulse entering means than siad pulse carrying means.

5. An exposure control device for a photographic shutter comprising, shutter control means for opening and closing a shutter to produce exposures of variable duration, the duration of said exposure caused by said shutter control means being controllable by digital pulses, pulses producing means for producing digital pulses, said pulse producing means having a photo-electric conversion element to convert a light brightness to an electrical quantity and a digital pulse generating circuit connected with the photo-electric conversion element and producing a number of pulses proportional to the electrical quantity from said element, memory means coupled to said pulse generating circuit for memorizing and retaining the digital pulses produced by said pulse producing means, and drive means connected to detect digital pulses in said memorizing means for driving said shutter control means for a period proportional to the pulses in said memory means, said drive means including clock pulse forming means responsive to said control means for forming clock pulses and reading out the pulses in said memory means in response to operation of said control means.

6. An exposure control device for a photographic shutter comprising, shutter control means for opening and closing a shutter to produce exposures of variable duration, the duration of said exposure caused by said shutter control means being controllable by digital pulses, pulse producing means for producing digital pulses, said pulse producing means having a photo-electric conversion element to convert a light brightness to an electrical quantity and a digital pulse generating circuit connected with the photo-electric conversion element and producing a number of pulses proportional to the electrical quantity from said element, memory means coupled to said pulse generating circuit for memorizing and retaining the digital pulses produced by said pulse producing means, drive means connected to detect digital pulses in said memorizing means for driving said shutter control means for a period proportional to the pulses in said memory means, said drive means including a second pulse generating circuit for producing pulses having a predetermined repetition rate which start in response to said shutter control means opening the shutter, and a comparing circuit connected to said memory means for comparing the number of pulses in the memory means with the number of pulses produced by said second pulse producing circuit, said comparing circuit being connected to drive said shutter control means when the number of pulse memorized in said memory means and produced by said second pulse producing means are equal.

7. An apparatus as in claim 6, wherein said first and second pulse producing circuits produce pulses of equal periods.

8. An apparatus as in claim 6, wherein said first and second pulse producing circuits produce pulses of unequal periods, the repetition rate of said second pulse producing circuit being lower than that of the first pulse producing circuit.

9. An apparatus as in claim 2, wherein setting means set the pulse periods of said first and second pulse producing circuits on the basis of film sensitivity of the film being exposed.

10. An apparatus as in claim 9, wherein indicating means connected to said memory means calculate and indicate the content of said memory means as an indication of exposure time.

* * * * *